United States Patent
Chen et al.

(10) Patent No.: US 12,386,646 B2
(45) Date of Patent: Aug. 12, 2025

(54) CLUSTER INFRASTRUCTURE WITH ON-DEMAND ACTIVATION

(71) Applicant: Red Hat, Inc., Raleigh, NC (US)

(72) Inventors: Huamin Chen, Westboro, MA (US); Chen Wang, Chappaqua, NY (US); Ricardo Noriega De Soto, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 723 days.

(21) Appl. No.: 17/748,931

(22) Filed: May 19, 2022

(65) Prior Publication Data
US 2023/0376335 A1      Nov. 23, 2023

(51) Int. Cl.
*G06F 9/455* (2018.01)
*G06F 9/4401* (2018.01)
*G06F 9/48* (2006.01)
*G06F 9/50* (2006.01)
*G06F 11/14* (2006.01)

(52) U.S. Cl.
CPC ........ *G06F 9/45558* (2013.01); *G06F 9/4418* (2013.01); *G06F 9/485* (2013.01); *G06F 9/4881* (2013.01); *G06F 11/1469* (2013.01); *G06F 2009/45575* (2013.01); *G06F 2009/45595* (2013.01); *G06F 9/4856* (2013.01); *G06F 9/5077* (2013.01); *G06F 2201/84* (2013.01)

(58) Field of Classification Search
None
See application file for complete search history.

(56) References Cited

U.S. PATENT DOCUMENTS

| | | |
|---|---|---|
| 2004/0168168 A1 | 8/2004 | Shah |
| 2011/0078467 A1 | 3/2011 | Hildebrand |
| 2013/0204948 A1 | 8/2013 | Zeyliger et al. |
| 2019/0065323 A1 | 2/2019 | Dhamdhere et al. |
| 2019/0332411 A1* | 10/2019 | Leitao ................. G06F 9/4418 |
| 2020/0192690 A1* | 6/2020 | Gupta ................... H04L 67/34 |

OTHER PUBLICATIONS

Github, Inc.: "Scale down ControlPlane components on hibernation", Nov. 11, 2021, 3 pages.
Smith, Steve: "On-demand activation of Docker containers with systemd", Mar. 4, 2015, 6 pages.

* cited by examiner

*Primary Examiner* — Qing Yuan Wu
(74) *Attorney, Agent, or Firm* — Womble Bond Dickinson (US) LLP

(57) ABSTRACT

A request is received over a network. The request is directed to a service provided by an application of a cluster infrastructure. The cluster infrastructure includes the application and a control plane to schedule execution of the application. Responsive to receiving the request, the control plane of the cluster infrastructure is transitioned from a stopped state to an active state. The request is transferred to the cluster infrastructure.

20 Claims, 9 Drawing Sheets

CLUSTER INFRASTRUCTURE WITH ON-DEMAND ACTIVATION

TECHNICAL FIELD

Aspects of the present disclosure relate to computer cluster infrastructures, and more particularly, to the on-demand activation of clustering infrastructures.

BACKGROUND

Containers are components executing on an operating system that provide an environment for applications to run, while being isolated from any other components of a host machine, network, or data center etc. Multiple containers may execute on a single operating system kernel and share the resources of the hardware upon which the operating system is running.

A clustering infrastructure may schedule one or more containers for execution on one or more computing nodes (e.g., a computer server, virtual machine, or processing device). For example, load balancers or other types of scheduling operations may be used to distribute the one or more containers among the one or more computing nodes to execute services provided by the containers.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

In computer systems supporting development and execution of application services, virtual machines and/or containers may be used. As an example, a virtual machine ("VM") may be a robust simulation of an actual physical computer system utilizing a hypervisor to allocate physical resources to the virtual machine. As another example, containers are active components executing on an operating system of a host system that provide an environment for applications to run, while being isolated from any other components of the host system. Multiple containers may execute on a single operating system kernel and share the resources of the hardware the operating system is running on.

Container-based virtualization systems may be lighter weight than systems using virtual machines with hypervisors. Containers may allow wide spread, parallel deployment of computing power for specific tasks. For example, a container may be instantiated to process a specific task and terminated after the task is complete. In large scale implementations, container orchestrators (e.g., Kubernetes®) may be used that manage the deployment and scheduling of large numbers of containers across multiple compute nodes. One example of a container orchestration platform is the Red Hat™ OpenShift™ platform built around Kubernetes.

Container orchestrators may employ cluster infrastructures. Cluster infrastructures may include a number of applications providing services (e.g., containers and/or VMs, also referred to as the data plane) and a control plane that manages the execution and/or distribution of the applications on one or more compute nodes. In a cluster infrastructure for containers, the compute nodes, which may include physical hosts, processors on a physical host, or virtual machines, may be configured as resources for execution of the containers. The container orchestrators may move the containers between and among the compute nodes as part of managing the execution of the containers. The control plane of the cluster infrastructure may perform the scheduling and/or load balancing of the containers, and their associated applications, among the compute nodes.

Cluster infrastructures, such as OpenShift clusters, may have portions which continue executing, regardless of whether they have active workloads. For example, the control plane of the cluster infrastructure may continue to execute on a processing device so as to remain available to handle traffic requests. The control plane may continue running even if the data plane (e.g., the applications providing the services) are no longer executing. This is neither cost efficient nor energy efficient. Although cluster hibernation in which the entire cluster is taken offline may help reduce this overhead, hibernated clusters may not be reactive to new traffic requests and thus may reduce the availability of the clusters and their associated services.

Figure 1A:
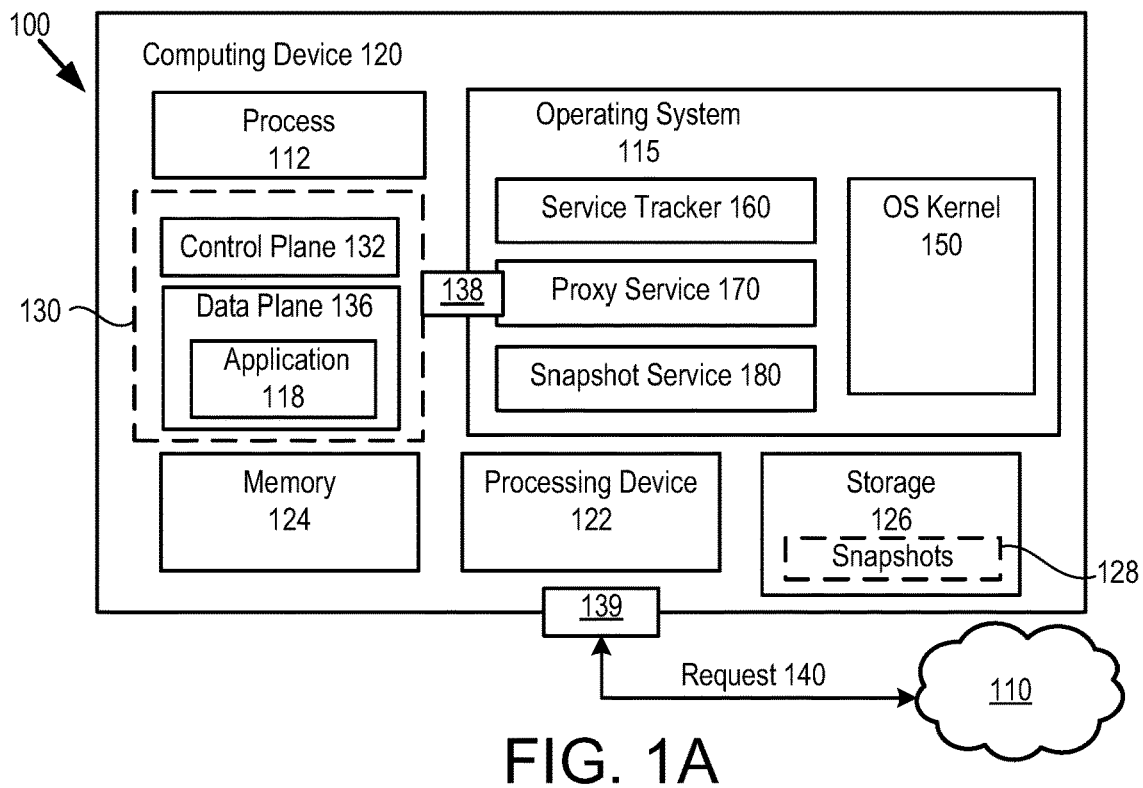
FIG. 1A is a block diagram that illustrates an example system, according to some embodiments of the present disclosure.

The present disclosure addresses the above-noted and other deficiencies by providing a demand-based activation for a cluster infrastructure that is capable of scaling the control plane of the cluster infrastructure to zero (e.g., by transitioning the cluster infrastructure to an off, inactive and/or non-executing, state). In some embodiments of the present disclosure, the cluster infrastructure itself may be provided as a container, such that it can be quickly checkpointed (e.g., saved and/or backed up) and restored. This approach may allow both the data plane and the control plane of the cluster infrastructure (e.g., a Kubernetes cluster) to scale to zero utilization when there are no requests for services running on the applications of the cluster infrastructure, thus improving cost and energy efficiency. Embodiments provided by the present disclosure may allow the cluster infrastructure to go to hibernation once there are no requests for services and the cluster infrastructure is no longer needed. However, when the services running on the cluster infrastructure are requested again, embodiments of the present disclosure can automatically (e.g., without manual intervention) re-activate the cluster infrastructure for these services. The embodiments of the present disclosure provide consistency of runtime states for services before and after hibernation (i.e. all the components in control and data planes) via snapshotting techniques. The embodiments of the present disclosure are beneficial for services that have occasional request arrivals. For example, embodiments of the present disclosure may be useful for free trial users that are building their business/personal web pages and do not have many visits. Other examples include edge computing use cases, where edge devices may respond to sporadic requests for batch data processing in manufacturing plant floors, clinics, restaurants, retail stores, etc. Embodiments of the present disclosure may reduce an amount of processing and/or power resources utilized by a cluster infrastructure while maintaining a consistent level of service and responsiveness to incoming requests FIG. 1A is a block diagram that illustrates an example system 100, according to some embodiments of the present disclosure. FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1A, the system 100 includes a computing device 120. The computing device 120 may include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), storage device 126, and other hardware devices (e.g., sound card, video card, etc.). The storage device 126 of the computing device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The computing device 120 may comprise any suitable type of computing device or machine that has a programmable processor including, for example, server computers, desktop computers, laptop computers, tablet computers, smartphones, set-top boxes, etc. In some examples, the computing device 120 may comprise a single machine or may include multiple interconnected machines (e.g., multiple servers configured in a cluster). The computing device 120 may each execute or include an operating system (OS) 115, as discussed in more detail below. The operating system 115 of computing device 120 may manage the execution of other components (e.g., software, applications, etc.) and/or may manage access to the hardware (e.g., processors, memory, storage devices etc.) of the computing device 120.

The computing device 120 may be coupled to (e.g., may be operatively coupled, communicatively coupled, may communicate data/messages with) network 110. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI™ hotspot connected with the network 110 and/or a wireless carrier system that can be implemented using various data processing equipment, communication towers (e.g. cell towers), etc. The network 110 may carry communications (e.g., data, message, packets, frames, etc.) to and/or from computing device 120.

The computing device 120 may execute an operating system 115. Operating system 115 may be software to provide an interface between the computing hardware (e.g., processing device 122 and/or storage device 126) and applications running on the operating system 115. Operating system 115 may include an OS kernel 150 and a user space supporting the execution of one or more applications/processes 112. Operating system kernel 150 may include several operating system functionalities, including but not limited to process management, hardware interfaces, access control and the like. The OS kernel 150 may execute with an elevated privilege and may manage the administration of the operating system 115. Examples of operating systems 115 include WINDOWS™, LINUX™, ANDROID™, IOS™, and MACOS™.

As illustrated in FIG. 1A, computing device 120 may run a cluster infrastructure 130. For example, the cluster infrastructure 130 may be stored as computer instructions in memory 124, and may be executed by processing device 122. The cluster infrastructure 130 may include a control plane 132 and a data plane 136. In some embodiments, the cluster infrastructure 130 may be isolated from other executing portions of the computing device 120, in that it is not connected to other processes 112 of computing device 120.

The data plane 136 of the cluster infrastructure 130 may include an application 118. The application 118 may be a desktop application, a network application, a database application, or any other application that may execute within the data plane 136 of the cluster infrastructure 130. The application 118 may provide a service to clients of the computing device 120. For example, the application 118 may respond to incoming requests 140 to the computing device 120 (e.g., from network 110).

The control plane 132 of the cluster infrastructure 130 may control the execution and/or scheduling of the data plane 136. In some embodiments, requests for service (e.g., incoming request 140) may initially be provided to the control plane 132 for scheduling on the data plane 136. The control plane 132 may expose one or more access points, such as an application programming interface (API) of the application 118.

Figure 1B:
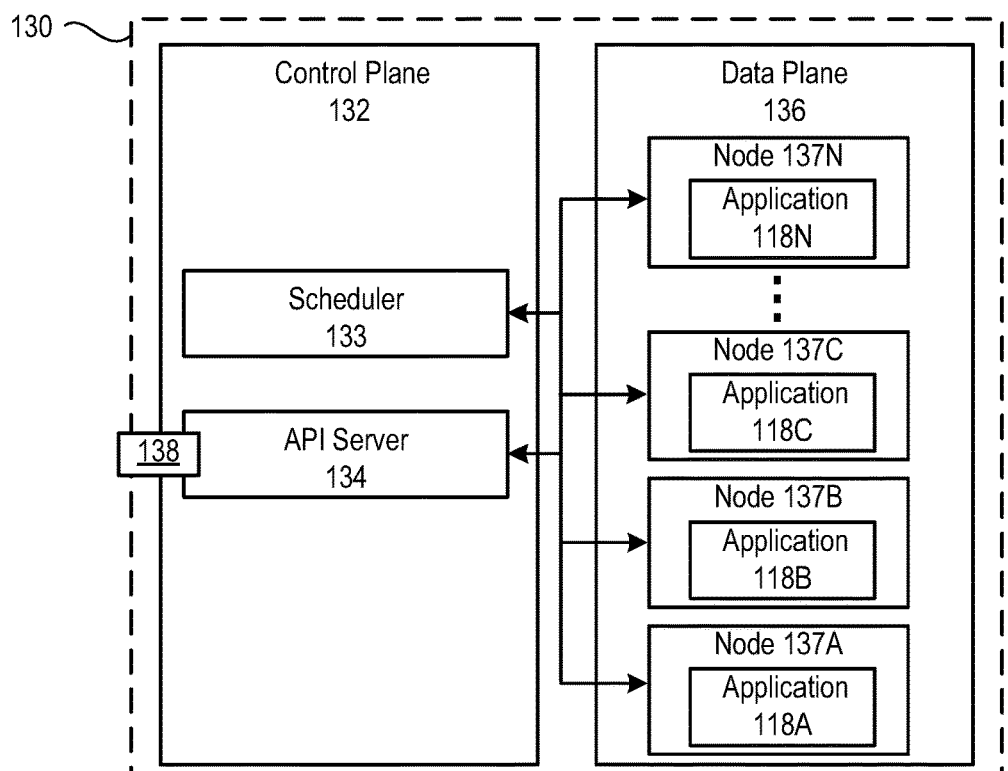
FIG. 1B is a block diagram that illustrates additional detail of a cluster infrastructure similar to that of FIG. 1A, according to some embodiments of the present disclosure.

FIG. 1B is a block diagram that illustrates additional detail of a cluster infrastructure 130 similar to that of FIG. 1A, according to some embodiments of the present disclosure. FIG. 1B provides additional detail, for example, regarding the control plane 132 and the data plane 136 of the cluster infrastructure 130.

Referring to FIG. 1B, the data plane 136 may include a plurality of execution nodes 137. As an example only, FIG. 1B illustrates execution nodes 137A, 137B, 137C through 137N. The execution nodes 137 may be threads, processes, or processing devices, in some embodiments. The execution nodes 127 may be assigned one or more applications 118. As previously described, the applications 118 may provide one or more services of the cluster infrastructure 130. As an example only, FIG. 1B illustrates applications 118A, 118B, 118C through 118N. As a non-limiting example, in a Kubernetes configuration, the node may correspond to a worker node, and the application 118 may correspond to a container. Applications 118A to 118N may be different instantiations of the same application 118 (e.g., providing a same service, but the embodiments of the present disclosure are not limited to such a configuration. In some embodiments, one or more of the applications 118A to 118N may be different (e.g., comprise a different executable and/or provide a different service) than other ones of the applications 118A to 118N.

The control plane 132 may include a scheduler 133 and an API server 134. The scheduler 133 may schedule the applications 118 on the various nodes 137. For example, in some embodiments, the scheduler 133 may perform a load balancing function for incoming requests 140 to the cluster infrastructure 130 (e.g., request 140 of FIG. 1A). In response to receiving a request 140, the scheduler 133 may determine which of the nodes 137 is available for execution of the request 140, and forward the request to the determined node 137.

The API server 134 may expose API functionality for the applications 118. For example, the API server may listen for requests on an access point 138 (e.g., on a particular network port) and, after processing the requests, such as for security or validation, provide the request to the scheduler 133 for operation by the applications 118 of the various nodes 137. In some embodiments, the incoming requests (e.g., request 140 of FIG. 1A) or other communication may be directed directly to the applications 118 of the nodes 137, bypassing the API server 134.

Referring back to FIG. 1A, in some embodiments, the cluster infrastructure 130 may be configured to execute on the computing device 120, e.g., utilizing the processing device 122. In some embodiments, the computing device 120 may provide a service tracker 160. The service tracker 160 may be or include computer instructions and/or circuitry to monitor the cluster infrastructure 130. In some embodiments, the service tracker 160 may monitor the cluster infrastructure 130 to detect access points 138 that the cluster infrastructure 130 provides as part of its execution of the application 118. The access points 138 may include open ports that are exposed externally to the cluster infrastructure 130. An example of an access point 138 includes a web server and/or associated uniform resource locator (URL), which may be provided (e.g., listening for connections) on a port that is opened (e.g., port 80) on the computing device 120. Such an access point 138 may listen for requests (e.g., request 140) for access to the application 118. The service tracker 160 may monitor the cluster infrastructure 130 for the creation of such access points 138 and intercept them. Information related to the access point 138 may be discovered by the service tracker 160 and provided to a proxy service 170. Additional details of the operations of the service tracker 160 will be provided further herein.

The proxy service 170 may be configured to expose a proxy access point 139 that intercepts requests directed to access point 138 of the cluster infrastructure 130. The proxy service 170 may be capable of receiving a request 140 on the proxy access point 139 even if the cluster infrastructure 130, including a control plane 132 of the cluster infrastructure 130, is not available. The proxy service 170 may be configured to transition the cluster infrastructure 130 from a stopped state to an executing state in response to receiving the request on the proxy access point 138. Additional details of the operations of the proxy service 170 will be provided further herein.

The computing device 120 may also include a snapshot service 180. The snapshot service 180 may be configured to take a snapshot 128 of the cluster infrastructure 130. A snapshot 128 may be a data record of an operating state of the cluster infrastructure 130. In some embodiments, the snapshot 128 may be stored in storage 126 of and/or connected to the computing device 120. The snapshot 128 of the cluster infrastructure 130 may be used to transition the cluster infrastructure 130 from a stopped state to an executing state, and vice versa. For example, while the cluster infrastructure 130 is executing, the snapshot service 180 may take a snapshot 128 of the executing cluster infrastructure 130. The snapshot 128 may capture a current state of the memory, data, and other electronic state of the cluster infrastructure 130, which can be saved/written into storage 126. To restore the cluster infrastructure 130 from the snapshot 128, the snapshot 128 may be loaded into the computing device 120 (e.g., into memory 124), including the state of the captured data, and may be transitioned to a running state. Once restored from the snapshot 128, the cluster infrastructure 130 may begin executing at the same state as when the snapshot 128 was taken. Restoring from a snapshot 128 can be differentiated from beginning an execution of the cluster infrastructure 130 in that the snapshot 128 can omit operations to initialize the cluster infrastructure 130, and a state of the cluster infrastructure 130 (e.g., of the applications 118) may be maintained in a same state as when the snapshot 128 was taken. Thus, the cluster infrastructure 130 can be transitioned from a stopped state to a running state based on the snapshot 128, without having to run through a full initialization.

Figure 2A:
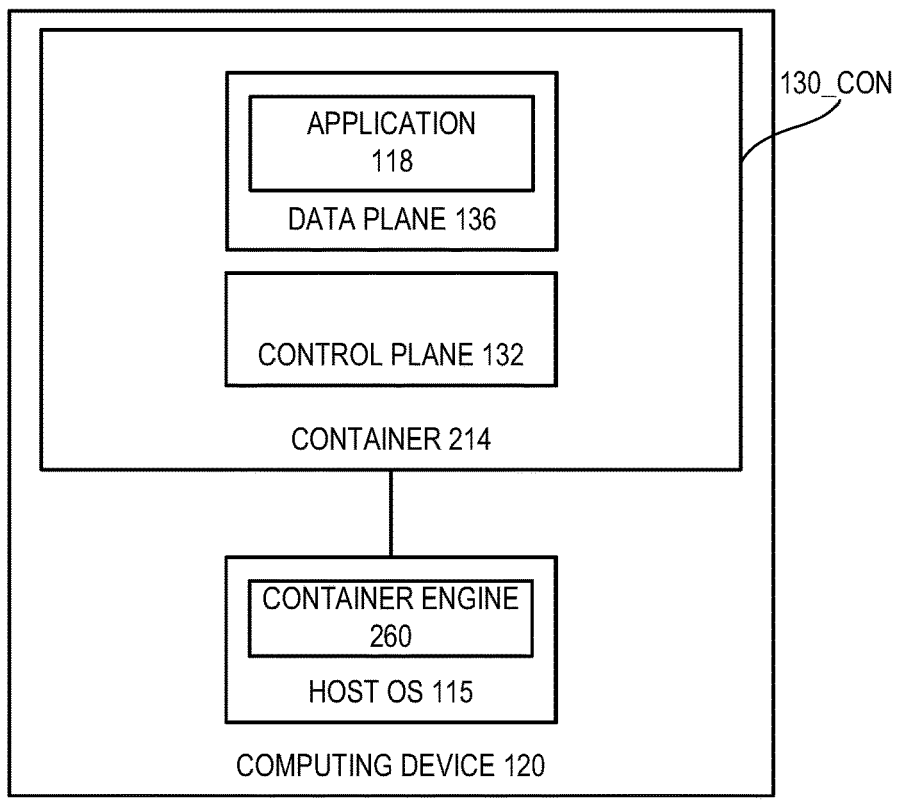
FIGS. 2A and 2B are block diagrams contrasting the use of a container executing as a cluster infrastructure within a computing device and an example virtual machine executing as a cluster infrastructure within a computing device, according to some embodiments of the present disclosure.
Figure 2B:
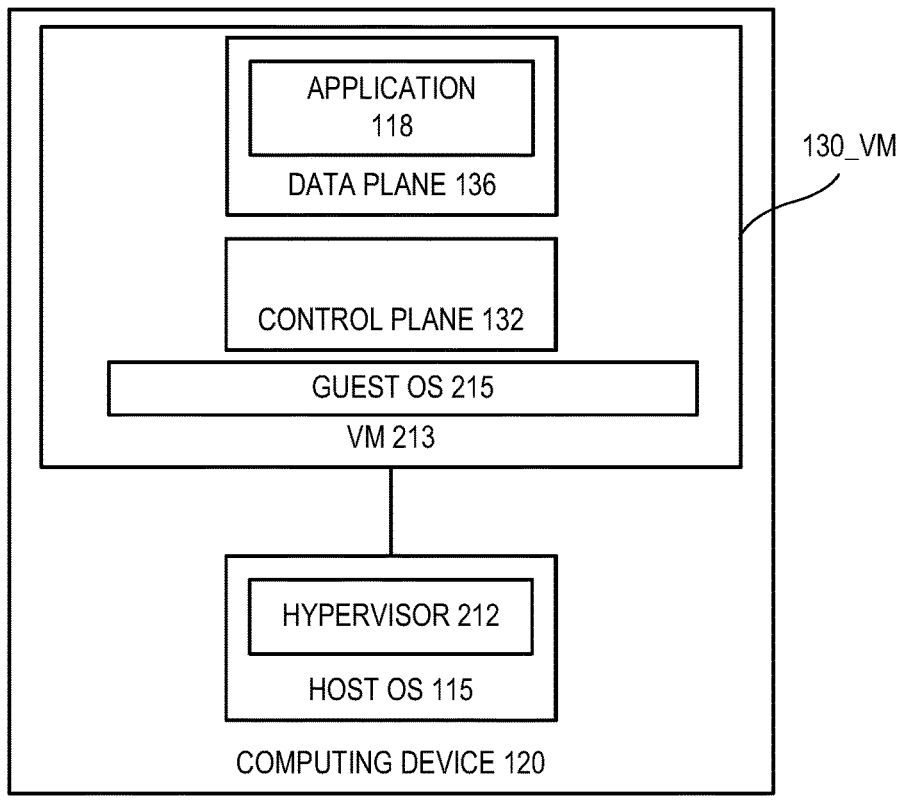

The cluster infrastructure 130 may be implemented in a variety of ways. For example, in some embodiments, the cluster infrastructure may be implemented with the control plane 132 and the data plane 136 implemented as software containers (e.g., a container image). In some embodiments, the cluster infrastructure may be implemented with the control plane 132 and the data plane 136 implemented utilizing VMs. FIG. 2A is a block diagram that illustrates an example in which a cluster infrastructure 130 is implemented as a container executing within a computing device, in accordance with some embodiments of the present disclosure. FIG. 2B is a block diagram that illustrates an example in which a cluster infrastructure 130 is implemented as a virtual machine executing within a computing device, in accordance with some embodiments of the present disclosure. FIGS. 2A and 2B contrast the use of a virtual machine with the use of a container to form the cluster infrastructure 130 of FIGS. 1A and 1B.

Referring to FIG. 2A, in an embodiment incorporating a container-based cluster infrastructure 130_CON, a computing device 120 may include hardware (e.g., processing devices, memory, storage devices, other devices, etc.) and a host OS 115. A container 214 may execute as part of the host OS 115 on the computing device 120. In one embodiment, the container 214 may be an isolated set of resources allocated to executing an application 118 and may be process independent from other applications, software, and/or processes. The host OS 115 may use namespaces to isolate the resources of the container 214 from other applications (or containers) executing on the host OS 115. Container 214 may not implement separate guest OS (as will be described with respect to guest OS 215 of the VM 213 illustrated in FIG. 2B). The container 214 may share the kernel, libraries, and binaries of the host OS 115 with other containers 214 that are executing on the computing device 120. Although FIG. 2A illustrates one container 214, the computing device 120 may include multiple containers 114 in other embodiments.

In some embodiments, a container engine 260 may allow different containers 214 to share the host OS 115 (e.g., the OS kernel, binaries, libraries, etc.) of the computing device 120. For example, the container engine 260 may multiplex the binaries and/or libraries of the host OS 115 between multiple containers 214. The container engine 260 may also facilitate interactions between the container 214 and the resources of the computing device 120. For example, the container engine 260 may manage requests from container 214 to access a memory (e.g., a RAM) of the computing device 120. In another example, the container engine 260 may manage requests from the container 214 to access certain libraries/binaries of the host OS 115. In other embodiments, the container engine 260 may also be used to create, remove, and manage containers 214. In one embodiment, the container engine 260 may be a component of the host operating system 115 (e.g., Red Hat® Enterprise Linux). In another embodiment, container engine 260 may run on top of a host operating system 115, or may run directly on host hardware without the use of a host operating system 115.

The container-based cluster infrastructure 130_CON may be formed of the container 214 which includes the control plane 132 (including the control plane applications discussed herein with respect to FIG. 1B) and the data plane 136. In some embodiments, the application 118 of the data plane 136 may also be implemented as a container. That is to say that is some embodiments, the container 214 may include additional containers (e.g., application 118) that are controlled and executed within the container 214, though the embodiments of the present disclosure are not limited to such a configuration.

Referring to FIG. 2B, in an embodiment incorporating a VM-based cluster infrastructure 130_VM, a computing device 120 may include hardware (e.g., processing devices, memory, storage devices, other devices, etc.) and a host OS 115. As discussed above, one type of a virtual environment may be a virtual machine (VM) 213 executing on a computing device 120. In some embodiments, the VM 213 may be a software implementation of a machine (e.g., a software implementation of a computing device) that includes its own operating system (referred to as guest OS 215), including its own kernel, and executes application programs, applications, software. VM 213 may be, for example, a hardware emulation, a full virtualization, a para-virtualization, and an operating system-level virtualization VM.

Computing device 120 may include a hypervisor 212, which may also be known as a virtual machine monitor (VMM). In the example shown, hypervisor 212 may be a component of a host operating system 115. In another example, hypervisor 212 may run on top of a host operating system 115, or may run directly on host hardware without the use of a host operating system 115. Hypervisor 212 may manage system resources, including access to physical processing devices (e.g., processors, CPUs, etc.), physical memory (e.g., RAM), storage device (e.g., HDDs, SSDs), and/or other devices (e.g., sound cards, video cards, etc.).

The hypervisor 212, though typically implemented in software, may emulate and export a bare machine interface to higher level software in the form of virtual processors and guest memory. Higher level software may comprise a standard or real-time operating system (OS), may be a highly stripped down operating environment with limited operating system functionality, may not include traditional OS facilities, etc. Hypervisor 212 may present other software (i.e., "guest" software) the abstraction of one or more virtual machines (VMs) that provide the same or different abstractions to various guest software (e.g., guest operating system, guest applications).

VM 213 may form part of the VM-based cluster infrastructure 130_VM that may execute guest software that uses an underlying emulation of the physical resources (e.g., virtual processors and guest memory). As illustrated in FIG. 2B, VM 213 may execute the control plane 132 and the data plane 136 as part of the guest OS 215. In some embodiments, the control plane 132 (including the control plane applications discussed herein with respect to FIG. 1B), may execute as one or more processes as part of, or controlled by, guest OS 215. For example, the applications of the control plane 132 may run within a user space provided by the guest OS 215. The application 118 of the data plane 136 may also run within the user space provided by the guest OS 215, but the embodiments of the present disclosure are not limited to such a configuration. In some embodiments, the application 118 of the data plane 136 may be implemented as a container. That is to say that the cluster infrastructure 130_VM may be implemented as a virtual machine, but the applications 118 within the virtual machine may be implemented as a container (e.g., with a container engine provided by the guest OS 215).

FIGS. 2A and 2B illustrate some of the differences between a container-based cluster infrastructure 130_CON (FIG. 2A) and a VM-based solution cluster infrastructure 130_VM (FIG. 2B). In a VM-based solution, an entire virtual system, including a OS kernel and operating system (e.g., guest OS 215) are utilized to execute the data plane 136 (e.g., application 118) and the control plane 132. While this can allow for a wide range of support, it may increase the overhead to execute the application 118. In contrast, in a container-based solution, the cluster infrastructure 130_CON executes from a same host OS 115, eliminating the need for a full guest OS installation.

Though FIGS. 2A and 2B illustrate configurations in which either a VM-based cluster infrastructure 130 or a container-based cluster infrastructure 130 are utilized, the following discussion will focus on container-based implementations for ease of discussion. It will be understood, however, that the embodiments of the present disclosure are not limited to container-based cluster infrastructures 130.

Figure 3A:
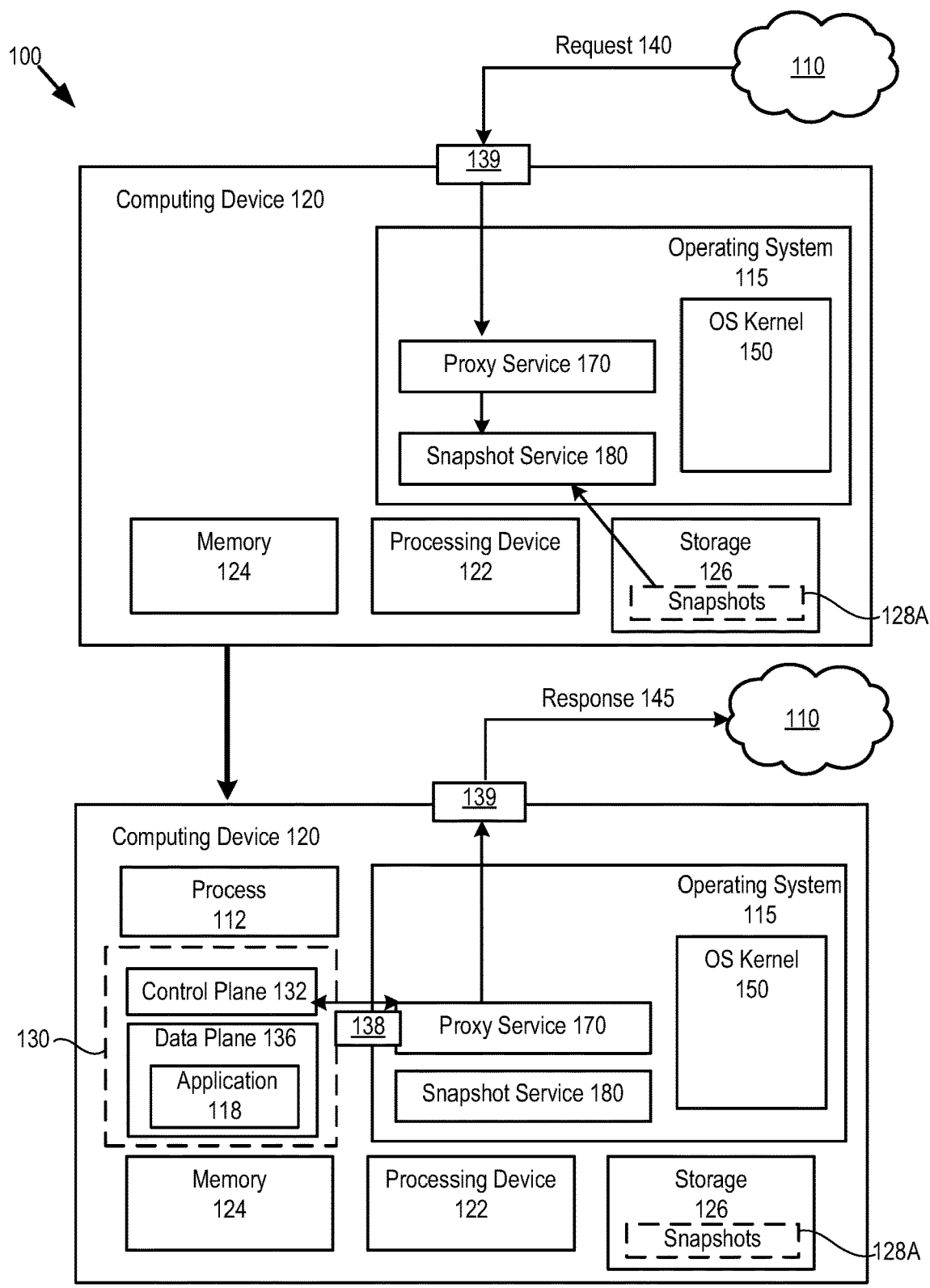
FIGS. 3A and 3B are schematic block diagrams illustrating examples of managing the transition of the cluster infrastructure, according to some embodiments of the present disclosure.
Figure 3B:
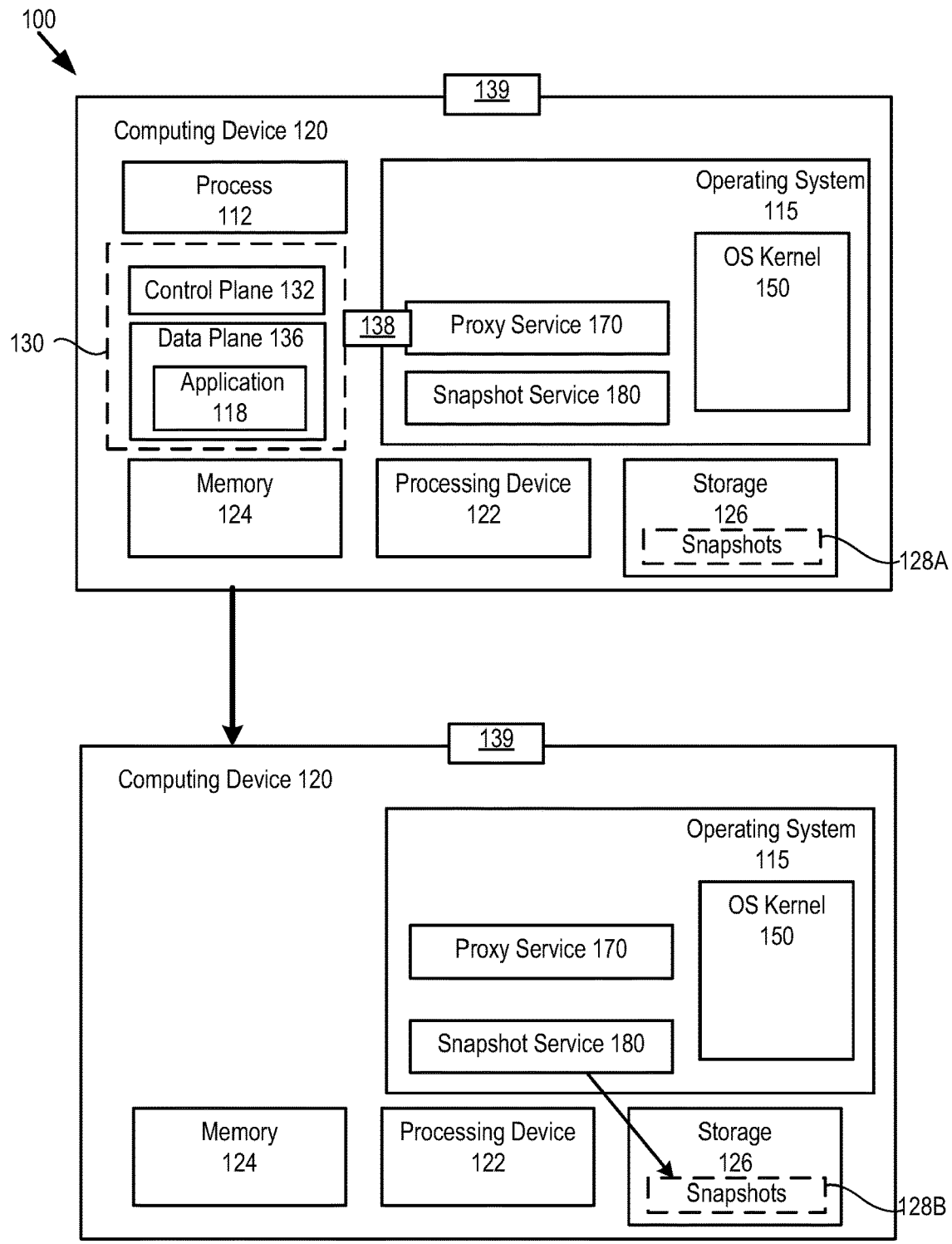

As described herein, proxy service 170 may be used to proxy requests for the cluster infrastructure 130 and transition a cluster infrastructure 130 from a stopped state to an active and/or executing state. FIGS. 3A and 3B are schematic block diagrams illustrating examples of managing the transition of the cluster infrastructure 130, according to some embodiments of the present disclosure. A description of elements of FIGS. 3A and 3B that have previously described has been omitted for brevity.

Referring to FIG. 3A, system 100 may include computing device 120, including memory 124, processing device 122, and storage 126. The processing device 122 may execute an operating system 115, including OS kernel 150. The processing device 122 may also execute proxy service 170 and snapshot service 180. For example, proxy service 170 and snapshot service 180 may be stored in memory 124, which is accessed by the processing device 122 during execution.

Storage 126 may contain, for example, a snapshot 128A of a cluster infrastructure 130. The snapshot 128A may contain data sufficient to restore the cluster infrastructure 130 to operation, with the data and execution point of the cluster infrastructure 130 set as of a time when the snapshot 128A was taken. In some embodiments, the snapshot 128A may be a backup taken of the cluster infrastructure 130 at a particular point in time. The snapshot 128A may include a copy of the current data of the cluster infrastructure 130 and other memory contents.

The proxy service 170 may be configured to listen for requests to the cluster infrastructure 130. For example, as discussed herein with respect to FIGS. 1A and 1B, the cluster infrastructure 130 may be configured to expose an access point 138. The control plane 132 and/or data plane 136 of the cluster infrastructure 130 may be configured to listen on the access point 138 for requests 140 (e.g., over network 110). Rather than exposing the access point 138 of the cluster infrastructure 130 externally to the computing device 120, the proxy service 170 may instead expose a proxy access point 139 and intercept any incoming requests 140 directed to the access point 138 of the cluster infrastructure 130. In the example of FIG. 3A, the proxy service 170 may receive a request 140 despite the fact that the cluster infrastructure 130 is not yet running/operational.

Upon receiving the request 140 at the proxy access point 139, the proxy service 170 may determine that the request 140 is intended for cluster infrastructure 130. For example, the proxy service 170 may maintain a mapping between the proxy access point 139 and the cluster infrastructure 130. The proxy service 170 may determine if the cluster infrastructure 130 is operational. If the cluster infrastructure 130 is operational, the proxy service 170 may pass the request 140 on to the access point 138 of the cluster infrastructure 130.

If the cluster infrastructure 130 is not operational, as is the case in the example of FIG. 3A, the proxy service 170 may direct a message to snapshot service 180. The snapshot service 180 may determine if a snapshot 128A is available (e.g., in storage 126). If the snapshot 128A is available, the snapshot service 180 may proceed with restoring the snapshot 128A to an active running state. Restoring the snapshot 128A of the cluster infrastructure 130 may involve loading the data of the snapshot 128A from the storage 126 into memory 124 and configuring the processing device 122 according to the data of the snapshot 128A. Restoring the snapshot 128A may transition the cluster infrastructure 130 from a stopped state to an active and/or running state (e.g., executing on the processing device 122), with a current state that is substantially identical to when the snapshot 128A was taken.

Referring to the lower half of FIG. 3A, once the cluster infrastructure 130 has transitioned to an active state, the proxy service 170 may pass the request 140 to the access point 138. The cluster infrastructure 130 may be unaware that the request 140 is from the proxy service 170 rather than the network 110, but the embodiments of the present disclosure are not limited to such a configuration.

Once the cluster infrastructure 130 has completed the request 140, a response 145 may be passed back to the proxy service 170. The proxy service 170 may provide the response 145 to the network 110 (e.g., to the initiating client device). Though FIG. 3A illustrates that the response 145 passes through the proxy service 170, embodiments of the present disclosure are not limited to such a configuration. In some embodiments, the cluster infrastructure 130 may provide the response 145 directly to the network 110 (e.g., via a network interface of the cluster infrastructure 130).

In the example of FIG. 3A, it is assumed that a snapshot 128A of the cluster infrastructure 130 is available in storage 126. In some embodiments, the snapshot 128A may not be present and/or available. In such embodiments, the snapshot service 180 and/or the proxy service 170 may start the cluster infrastructure 130 from scratch (e.g., from an executable) rather than through the use of a snapshot 128A. In such a scenario, the proxy service 170 may wait until the cluster infrastructure 130 is up and running before passing the request 140 to the cluster infrastructure 130.

Though the proxy service 170 and the snapshot service 180 are illustrated as separate identities in FIG. 3A, this is merely for purposes of explanation. In some embodiments, the proxy service 170 may perform the duties of the snapshot service (e.g., be responsible for saving and/or loading snapshots 128).

FIG. 3B illustrates an example in which the cluster infrastructure 130 may be transitioned from an active state to an inactive and/or stopped state. Referring to FIG. 3B, the computing device 120 may determine that it would be beneficial to transition the cluster infrastructure 130 to an inactive state. For example, in some embodiments, the proxy service 170 may determine that a time duration since a request 140 has been received on proxy access point 139 has exceeded a defined duration, e.g., one hour. In some embodiments, the computer device 120 may determine that a defined time point has been reached (e.g., the cluster infrastructure 130 is stopped after 10 PM). As would be apparent to one of ordinary skill in the art, other criteria for stopping the cluster infrastructure 130 may be used without deviating from the scope of the present disclosure.

Once the decision has been made to transition the cluster infrastructure 130 to the inactive and/or stopped state, the snapshot service 180 may perform a backup of the cluster infrastructure 130 to create snapshot 128B. The snapshot 128B may capture a current state of the cluster infrastructure 130 such that the cluster infrastructure 130 may be restored in a substantially identical state to when the snapshot 128B was taken. The snapshot 128B of FIG. 3B may be different from the snapshot 128A of FIG. 3A in that the snapshot 128B reflects differences in the operating state of the cluster infrastructure 130 that have taken place since the snapshot 128A was reactivated.

Referring to the lower half of FIG. 3B, as part of taking the snapshot 128B, the snapshot service 180 may store the snapshot 128B in storage 126. The snapshot 128B may then be available for the next point in time in which the activation of the cluster infrastructure 130 is desired, such as the process illustrated with respect to FIG. 3A.

The embodiments of the present disclosure provide a mechanism by which a cluster infrastructure 130 may be dynamically (e.g., without manual intervention) started in response to incoming traffic (e.g., request 140). The dynamic nature of the embodiments described herein allow for the cluster infrastructure 130 to be transitioned to stopped/inactive when it would be beneficial to do so, such as when traffic to the cluster infrastructure 130 has ceased for a defined period of time. In such a way, cluster infrastructures 130 that receive sporadic traffic may be deactivated and/or stopped to save power, while still allowing the cluster infrastructure 130 to be restarted when traffic resumes.

In addition, embodiments of the present disclosure also stop the control plane 132 of the cluster infrastructure 130, in contrast to solutions that only adjust operation of the data plane 136. Thus, both the data and the control portions of the cluster infrastructure 130 may be stopped to save even more power. In some embodiments, the proxy service 170 may be demand-driven as well. For example, the proxy service 170 may only be activated in response to receiving traffic on the proxy access point 139. Thus, the proxy service 170 may utilize a fraction of the power and/or processing resources that might be utilized by the control plane 132 of the control infrastructure 130. Embodiments of the present disclosure therefore provide power savings and reduced operational overhead as compared to conventional systems.

Figure 4:
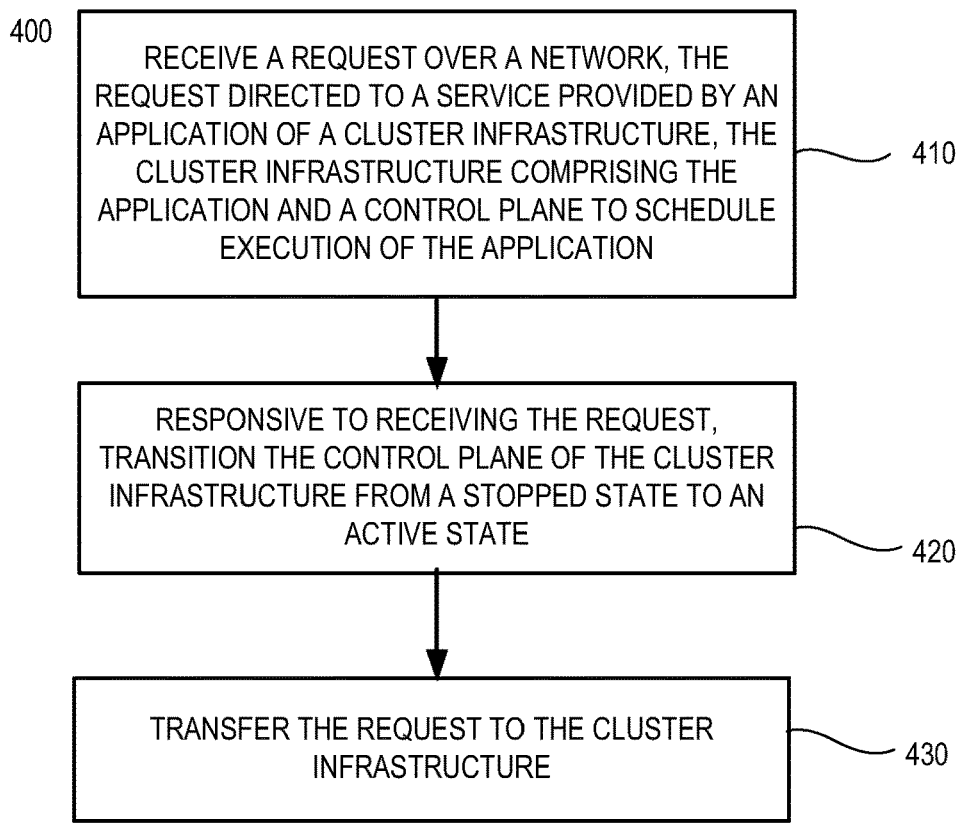
FIG. 4 is a flow diagram of a method for managing a cluster infrastructure, in accordance with some embodiments of the present disclosure.

FIG. 4 is a flow diagram of a method 400 for managing a cluster infrastructure, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIGS. 1A to 3B).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1A to 3B as well, the method 400 begins at block 410, in which a request 140 is received over a network 110, the request 140 directed to a service provided by an application 118 of a cluster infrastructure 130, the cluster infrastructure 130 comprising the application 118 and a control plane 132 to schedule execution of the application 118.

In some embodiments, the cluster infrastructure 130 includes a container image and/or a VM. In some embodiments, the cluster infrastructure 130 includes the container image, and the container image comprises the control plane 132 of the cluster infrastructure 130.

At block 420, responsive to receiving the request 140, the control plane 132 of the cluster infrastructure 130 may be transitioned from a stopped state to an active state. In some embodiments, transitioning the control plane of the cluster infrastructure 130 from a stopped state to an active state comprises restoring the cluster infrastructure 130 from a data snapshot 128.

In some embodiments, responsive to determining that a time duration since any request 140 has been received that is directed to the service provided by the application 118 has exceeded a defined duration, a data snapshot 128 of the cluster infrastructure 130 may be created, and the control plane 132 of the cluster infrastructure 130 may be transitioned from the active state to the stopped state.

At block 430, the request 140 may be transferred to the cluster infrastructure 130. In some embodiments, the cluster infrastructure 230 provides an access point 138 for accessing the service of the application 118, receiving the request 140 over the network 110 includes receiving the request 140 at a proxy access point 139, and transferring the request 140 to the cluster infrastructure 130 includes transferring the request 140 between the proxy access point 139 and the access point 138 provided by the cluster infrastructure 130.

In some embodiments, method 400 may further include: detecting a creation of the access point 138 provided by the cluster infrastructure 130; and, responsive to detecting the creation of the access point 138, creating the proxy access point 139 that is associated with the access point 138 provided by the cluster infrastructure 130. In some embodiments, detecting the creation of the access point 138 provided by the cluster infrastructure 130 includes monitoring a creation of the access point 138 and determining if the access point 138 is to be exposed to the network 110.

Figure 5:
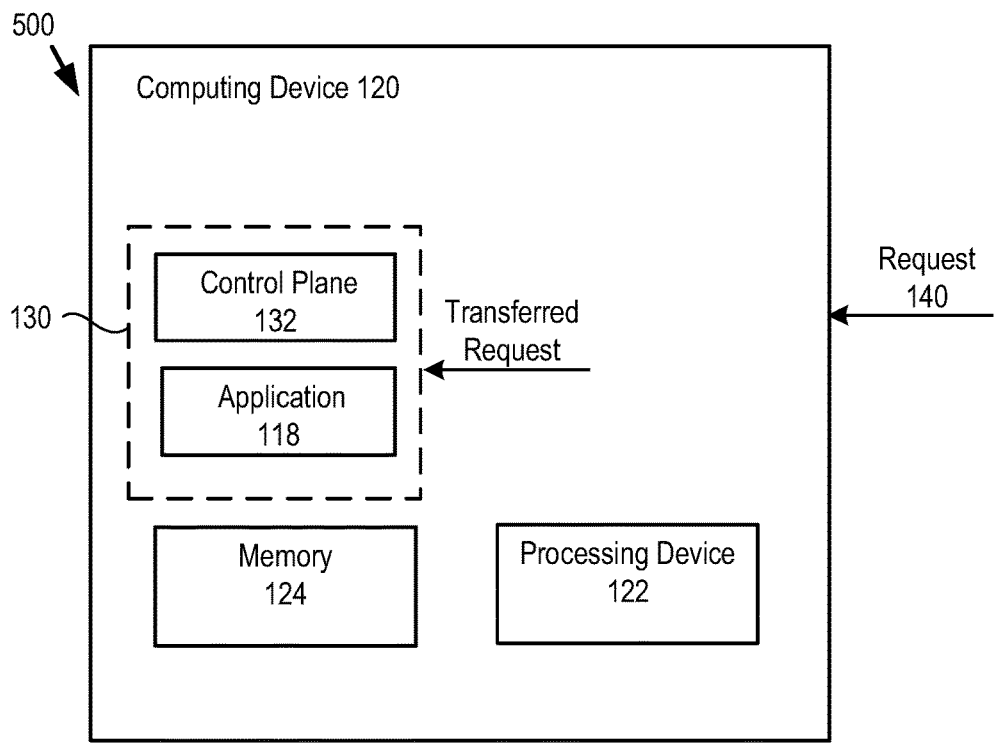
FIG. 5 is a component diagram of an example of a device architecture, in accordance with embodiments of the disclosure.

FIG. 5 is a component diagram of an example of a device architecture 500, in accordance with embodiments of the disclosure. The device architecture 500 includes computing device 120 having processing device 122 and memory 124, as described herein with respect to FIGS. 1A, 1B, 2A, 2B, 3A, and 3B.

The computing device 120 may receive request 140 directed to an application 118 of a cluster infrastructure 130. In response to receiving the request 140, the clustering infrastructure 130 may be transitioned from an inactive and/or stopped state to an active and/or executing state, as described herein with respect to FIGS. 3A and 3B. Transitioning the clustering infrastructure 130 to an active state may include transitioning a control plane 132 of the cluster infrastructure 130 from an inactive and/or stopped state to an active and/or executing state, as described herein with respect to FIGS. 3A and 3B. Once the cluster infrastructure 130 is active, the request 140 may be transferred to the cluster infrastructure 130 for processing.

The device architecture 500 of FIG. 5 provides the ability to dynamically control the execution of a cluster infrastructure 130 in a way that does not substantially impact performance. The device architecture 500 also allows the control plane 132 to be deactivated, further saving power and compute operations. The device architecture 500 provides technological improvement to conventional devices in that it reduces an amount of power utilized to provide a cluster infrastructure 130 while maintaining the ability for the cluster infrastructure 130 to timely respond to requests 140.

Figure 6:
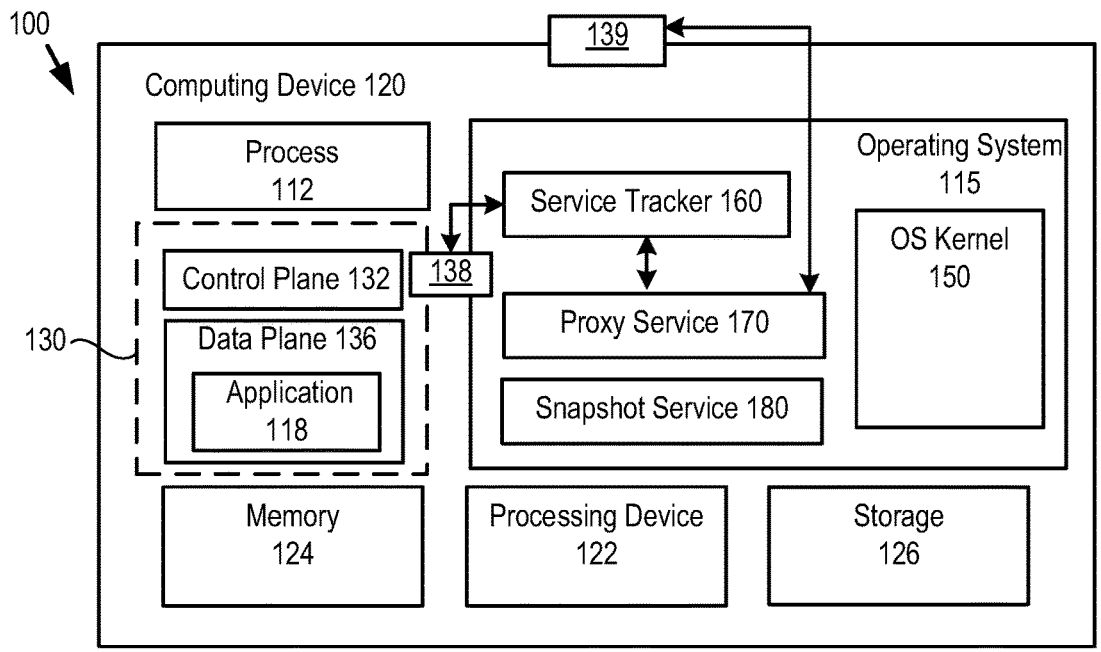
FIG. 6 is a schematic block diagram illustrating an example operation of detecting an access point, according to some embodiments of the present disclosure.

As described herein, service tracker 160 may monitor the cluster infrastructure 130 to detect access points 138 associated with services provided by the application 118 of the cluster infrastructure 130. Based on this detection, the service tracker 160 may configure the proxy service 170. FIG. 6 is a schematic block diagram illustrating an example operation of detecting access point 138 by service tracker 160, according to some embodiments of the present disclosure. A description of elements of FIG. 6 that have previously described has been omitted for brevity.

Referring to FIG. 6, system 100 may include computing device 120, including memory 124, processing device 122, and storage 126. The processing device 122 may execute an operating system 115, including OS kernel 150. The processing device 122 may also execute service tracker 160, proxy service 170, and/or snapshot service 180. For example, the service tracker 160, the proxy service 170, and snapshot service 180 may include computer instructions that are stored in memory 124, which is accessed by the processing device 122 during execution.

Service tracker 160 may be configured to monitor the execution of cluster infrastructure 130. As part of the execution of the cluster infrastructure 130, the cluster infrastructure 130 may establish access point 138. As described herein, access point 138 may correspond to an endpoint for queries/requests directed to a service provided by application 118 of the cluster infrastructure 130. The access point 138 may correspond, for example, to a network port that may receive requests (such as request 140 over network 110, as illustrated in FIG. 1A). In some embodiments, the access point 138 may be provided for an access interface of the application 118 (e.g., via the API server 134 of FIG. 1B). Thus, the access point 138 may be utilized to access the application 118 via that application interface, and request a service be performed by the application 118.

In some embodiments, the service tracker 160 may detect the access point 138, such as by monitoring for requests and/or operations to set up the access point 138. In some embodiments, the establishment of the access point 138 may utilize a request from the cluster infrastructure 130 to the operating system 115, such as a request to establish an endpoint. In some embodiments, the service tracker 160 may intercept such requests to detect the establishment of the access point 138.

Upon detecting the establishment of the access point 138, the service tracker 160 may communicate with and/or configure the proxy service 170 to establish the proxy access point 139 that corresponds to the access point 138. The service tracker 160 may provide sufficient information, for example, for the proxy service 170 to map a proxy access point 139 to the access point 138, and begin intercepting requests directed to the access point 138.

Embodiments of the present disclosure provide operations in which a proxy access point 139 may be dynamically created to correspond to, and intercept requests for, an access point 138 of the cluster infrastructure 130. By monitoring requests for the access point 138 using the proxy access point 139, the proxy service 170 may be made aware of communications directed to the cluster infrastructure 130 and may then make decisions about whether to, and when to, transition the cluster infrastructure 130 between an inactive/stopped state and a running state (e.g., as described herein with respect to FIGS. 3A and 3B).

Though the proxy service 170 and the service tracker 160 are illustrated as separate identities in FIG. 6, this is merely for purposes of explanation. In some embodiments, the proxy service 170 may perform the duties of the service tracker 160 (e.g., be responsible for detecting access points 138 of the cluster infrastructure 130).

Figure 7:
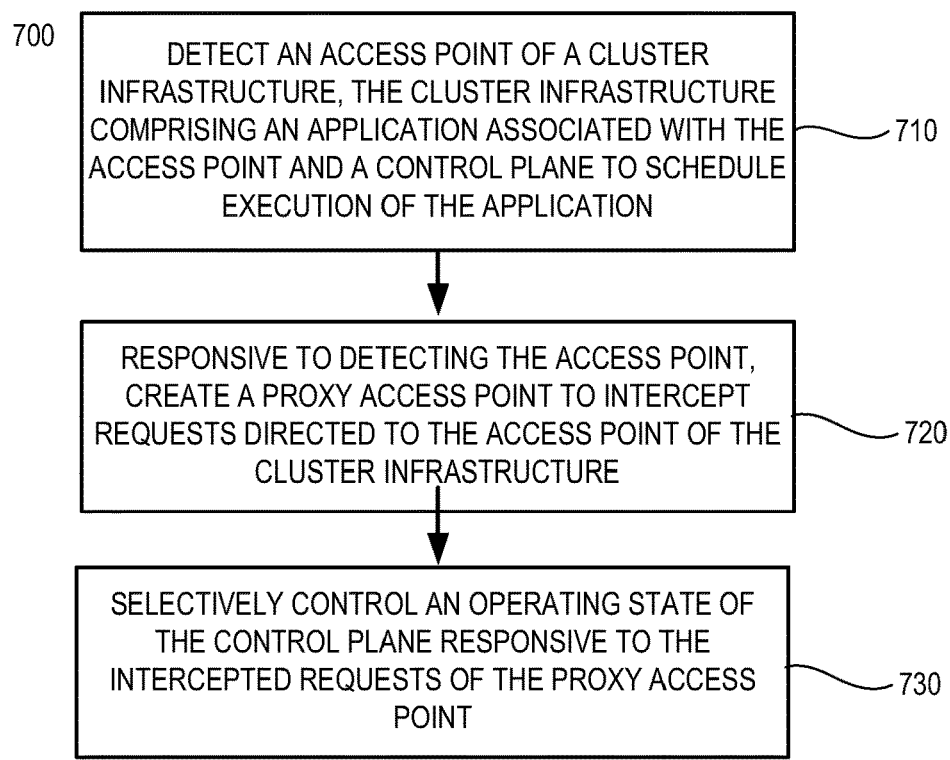
FIG. 7 is a flow diagram of a method for dynamically detecting an access point, in accordance with some embodiments of the present disclosure.

FIG. 7 is a flow diagram of a method 700 for dynamically detecting an access point, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a computing device (e.g., computing device 120 illustrated in FIGS. 1A to 6).

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Referring simultaneously to FIGS. 1A to 6 as well, the method 700 begins at block 710, in which an access point 138 of an application interface of a cluster infrastructure 130 is detected. The cluster infrastructure 130 may include an application 118 associated with the access point 138 and a control plane 132 to schedule execution of the application 118. In some embodiments, the cluster infrastructure 130 comprises a container image, a VM, or both a container image and a VM (e.g., the VM includes containers). In some embodiments, the cluster infrastructure 130 comprises a container image, and the container image comprises the control plane 132 of the cluster infrastructure 130. In some embodiments, the cluster infrastructure 130 further comprises a data plane 136, and the application 118 is within the data plane 136.

At block 720, responsive to detecting the access point 138, a proxy access point 139 may be created to intercept requests directed to the access point 138 of the cluster infrastructure 130. In some embodiments, detecting the access point 138 of the cluster infrastructure 130 includes monitoring a creation of the access point 138 and determining if the access point 138 is to be exposed to a network 110 coupled to the system 100. In some embodiments, determining if the access point is to be exposed to the network 110 coupled to the system 100 includes analyzing a type of a service provided by the application 118.

At block 730, an operating state of the control plane 132 may be selectively controlled responsive to the intercepted requests of the proxy access point 139. In some embodiments, selectively controlling the operating state of the control plane 132 responsive to the intercepted requests of the proxy access point 139 includes transitioning the control plane 132 of the cluster infrastructure 130 from a stopped state to an active state. In some embodiments, selectively controlling the operating state of the control plane 132 responsive to the intercepted requests of the proxy access point 139 includes transitioning the control plane 132 of the cluster infrastructure 130 from an active state to a stopped state responsive to determining that a time duration since any intercepted requests have been received has exceeded a defined duration. In some embodiments, selectively controlling the operating state of the control plane 132 responsive to the intercepted requests of the proxy access point 139 includes restoring the cluster infrastructure 130 from a data snapshot 128 responsive to receiving the intercepted requests.

In some embodiments, selectively controlling the operating state of the control plane 132 responsive to the intercepted requests of the proxy access point 139 includes, in response to intercepting a request 140 directed to the access point 138 of the cluster infrastructure 130, determining if the cluster infrastructure 130 is currently executing on the system, and, responsive to determining that the cluster infrastructure 130 is not currently executing on the system, initiating a restore of the cluster infrastructure 130 from a data snapshot 128 of the cluster infrastructure 130 in a storage device.

Figure 8:
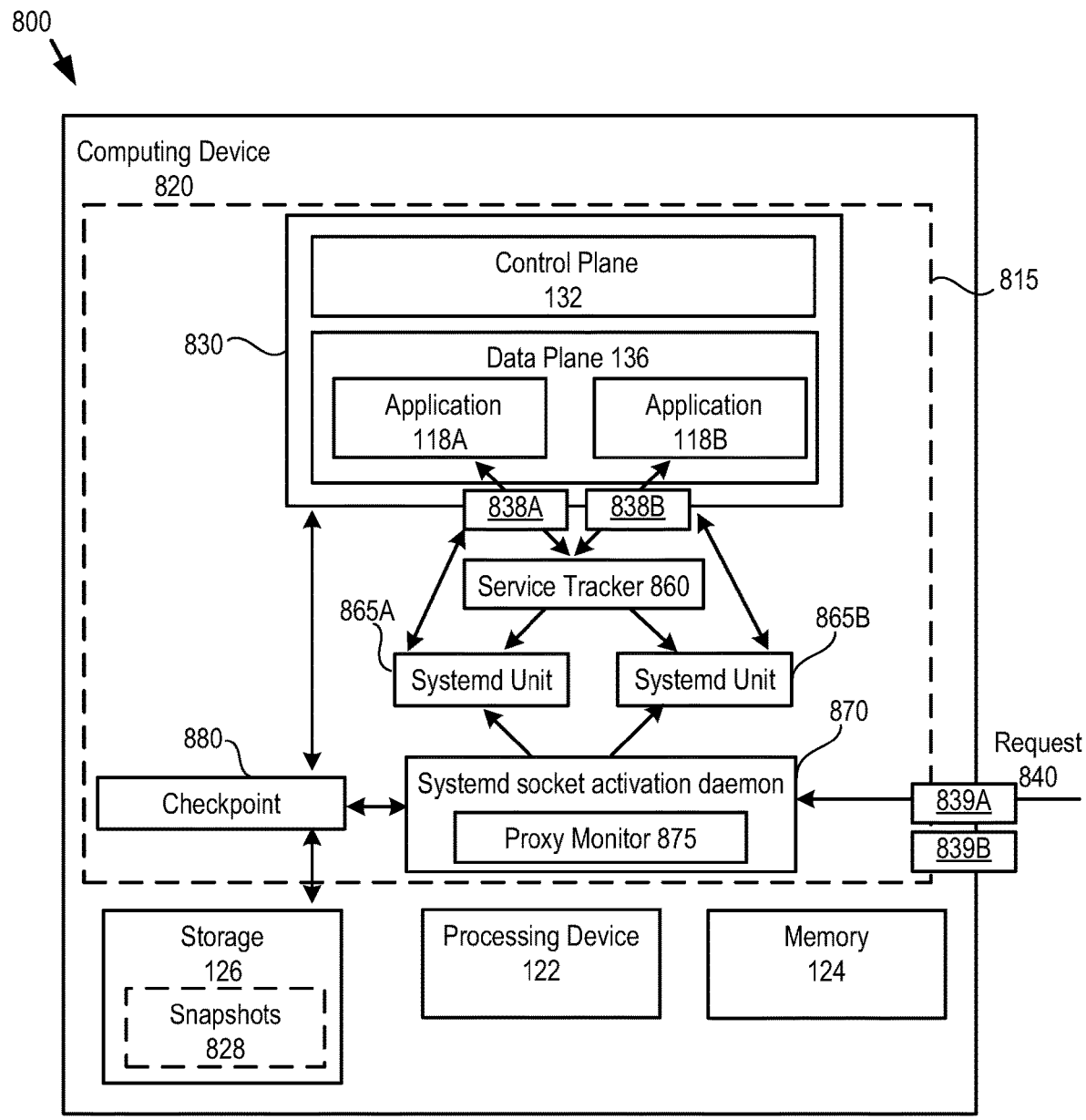
FIG. 8 is a schematic block diagram illustrating an example embodiment of a computer system for managing a cluster infrastructure, according to some embodiments of the present disclosure.

FIG. 8 is a schematic block diagram illustrating an example embodiment of a computer system 800 for managing a cluster infrastructure 830, according to some embodiments of the present disclosure. A description of elements of FIG. 8 that have previously described has been omitted for brevity.

Referring to FIG. 8, system 800 may include computing device 820, including memory 124, processing device 122, and storage 126. The processing device 122 may execute instruction code (e.g., as accessed from memory 124), portions of which are illustrated in FIG. 8. For example, the processing device 122 may execute an operating system 815. In the non-limiting example of FIG. 8, the operating system 815 may be a LINUX-based operating system 815.

As illustrated in FIG. 8, computing device 820 may run a cluster infrastructure 830. For example, the cluster infrastructure 830 may be stored as computer instructions in memory 124, and may be executed by processing device 122. The cluster infrastructure 830 may include a control plane 132 and a data plane 136. In some embodiments, the cluster infrastructure 830 may include a cluster based on Kubernetes/OpenShift that has been instantiated into a container image (e.g., similar to container 214 of FIG. 2A). The containerized cluster infrastructure 830 may be executed by way of a container engine (see FIG. 2A) executing within operating system 815.

In the example of FIG. 8, the containerized cluster infrastructure 830 may include two applications 118A, 118B within the data plane 136. The two applications 118A, 118B may be the same applications or different applications (e.g., providing different services). Each of the applications 118A, 118B may provide a respective application interface. For example, first application 118A may provide a first application interface via first access point 838A, and second application 118B may provide a second application interface via second access point 838B. In some embodiments, the first and second access points 838A, 838B may be provided via a service (e.g., an API service, such as API server 134 of FIG. 1B) of the control plane 132. For example, the control plane 132 may establish the first and second access points 838A, 838B via requests to the operating system 815. In some embodiments, the requests to create the first and second access points 838A, 838B may indicate that the first and second access points 838A, 838B are to be exposed externally to the computing device 820. For example, the first and second access points 838A, 838B may be respectively associated with a first externally visible proxy access point 839A and a second externally visible proxy access point 839B of the computing device 820. The first and second externally visible proxy access points 839A, 839B may be capable of receiving requests 840 (e.g., over a network to which the computing device 820 is connected, such as network 110 of FIG. 1A).

Checkpoint service 880, which may perform functions similar to snapshot service 180 described herein, may be configured to create, and restore, snapshots 828 of the containerized cluster infrastructure 830. Since the cluster infrastructure 830 is provided as a container, which may support the capability of being backed up and restored, the checkpoint service can checkpoint and restore the cluster infrastructure atomically.

In some embodiments, a service tracker 860, which may perform functions similar to service tracker 160 described herein, may monitor the containerized cluster infrastructure 830 and detect the creation of the first and second access points 838A, 838B that are externally visible. In some embodiments, externally visible refers to an access point that may be accessed by entities external to the computing device 820. For example, in a Kubernetes/OpenShift environment, the service tracker 860 may detect that the first and second access points 838A, 838B are associated with a service having a type of "LoadBalancer" or "NodePort". Upon detecting such a request for externally visible access points 838A, 838B, the service tracker 860 may create systemd service units 865. The systemd service units 865 may be, for example, segments of computer instructions that are configured to handle communications with the applications 118. Thus, the service tracker 860 may create a first systemd service unit 865A associated with the first access point 838A (and thus first application 118A) and create a second systemd service unit 865B associated with the second access point 838B (and thus second application 118B).

After creating the systemd service units 865, externally visible proxy access points 839A may be created. For example, a first proxy access point 839A may be created to be associated with the first access point 838A and a second proxy access point 839B may be created to be associated with the second access point 838B. The first and second proxy access points 839A, 839B may be configured to accept requests 840, which may be directed to one or more of the first and second applications 118A, 118B. In some embodiments, the first and second proxy access points 839A, 839B are sockets exposed by a network interface of the operating system 815.

The first and second proxy access points 839A, 839B may be associated with a systemd socket activation daemon 870. The systemd socket activation daemon 870 may perform some of the functions described herein with respect to proxy service 170. In some embodiments, the systemd socket activation daemon 870 may be a socket-activated network forwarder proxy. The systemd socket activation daemon 870 may be used to bi-directionally forward traffic between two sockets. An example of its operation is illustrated in FIG. 8. When a request 840 is received at one of the externally-visible proxy access points 839A, 839B, such as first proxy access point 839A, the systemd socket activation daemon 870 may be automatically activated in response to the request 840. The systemd socket activation daemon 870 may execute the systemd service unit 865 associated with the first proxy access point 839A, in this case first systemd service unit 865A.

Since the first systemd service unit 865A is associated with the containerized cluster infrastructure 830, the systemd socket activation daemon 870 may determine if the containerized cluster infrastructure 830 is currently executing. If the containerized cluster infrastructure 830 is not running, then the systemd socket activation daemon 870 (or the first systemd service unit 865A) may request that the checkpoint service 880 spin up (e.g., restore to execution from snapshot 828) the containerized cluster infrastructure 830 based on the data snapshot 828. Once the containerized cluster infrastructure 830 is executing, the first systemd service unit 865A may bi-directionally forward traffic between the first access point 838A and the first proxy access point 839A. It will be understood that though the example discussion of FIG. 8 focused on the operation of the first proxy access point 839A, the second proxy access point 839B (as well as any other proxy access points) may work similarly. The use of the systemd socket activation daemon 870 may allow for the activation of the systemd service units 865 dynamically in response to the receipt of the request 840. This may allow the computing device 120 to quickly transition the containerized cluster infrastructure 830 to a running state if it is stopped.

In some embodiments, a proxy monitor 875 may monitor the traffic received from the proxy access points 839. Should the traffic from the proxy access points 839 fall below a particular level or cease for a defined duration, the proxy monitor 875 may direct the checkpoint service 880 to create a snapshot 828 of the currently executing containerized cluster infrastructure 830 and transition the containerized cluster infrastructure 830, including the control plane 132, to a stopped state. In some embodiments, the proxy monitor 875 may transition the containerized cluster infrastructure 830 when traffic from all of the proxy access points 839 associated with the cluster infrastructure have ceased for the defined duration.

In some embodiments, the proxy monitor 875 may be optional, and the systemd service units 865 may be used to signal that the containerized cluster infrastructure 830 should be stopped. For example, once the systemd service units 865 no longer serve any requests and stay idle for a defined period of time, they may signal the systemd socket activation daemon 870 to exit. When the systemd socket activation daemon 870 receives the exit signals from all the systemd service units 865 associated with the containerized cluster infrastructure 830, the systemd socket activation daemon 870 may initiate a checkpoint (e.g., via the checkpoint service 880) of the containerized cluster infrastructure 830. The checkpoint may transition the containerized cluster infrastructure 830 to an inactive/stopped state (e.g., shuts the containerized cluster infrastructure 830 down).

In the Kubernetes/OpenShift example of FIG. 8, both control and data planes 132, 136 are fully containerized so that they can be activated, and deactivated, through a single entrypoint atomically. Containerized clusters may provide one way in which atomic and consistent snapshots (e.g., snapshots 828 provided by checkpoint service 880) may be conveniently made. The use of the container allows the control plane 132 to be transition to a stopped/inactive state during period of no traffic, but quickly reactivated when traffic appears.

Instead of managing the cluster as in some conventional techniques, embodiments according to the present disclosure provide consistent service level availability. Services and their dependencies running on the clusters may be tracked and honored so that the integrity of the services are maintained once activated. This can be implemented, for example, by the service tracker 860 that monitors the services provisioned by the applications 118 of the cluster infrastructure 830 and creates systemd service units 865 for these services.

Unlike simple cluster start and stop mechanisms used in some related techniques, the embodiments of the present disclosure provide that the runtime states of containerized services are maintained between activations so that no data loss or corruption will occur, thus supporting production deployment. This can be implemented by taking a snapshot of the current runtime state (e.g., through a checkpoint service 880, such as e.g. podman checkpoint) and restoring the containerized cluster infrastructure 830 as described herein.

Figure 9:
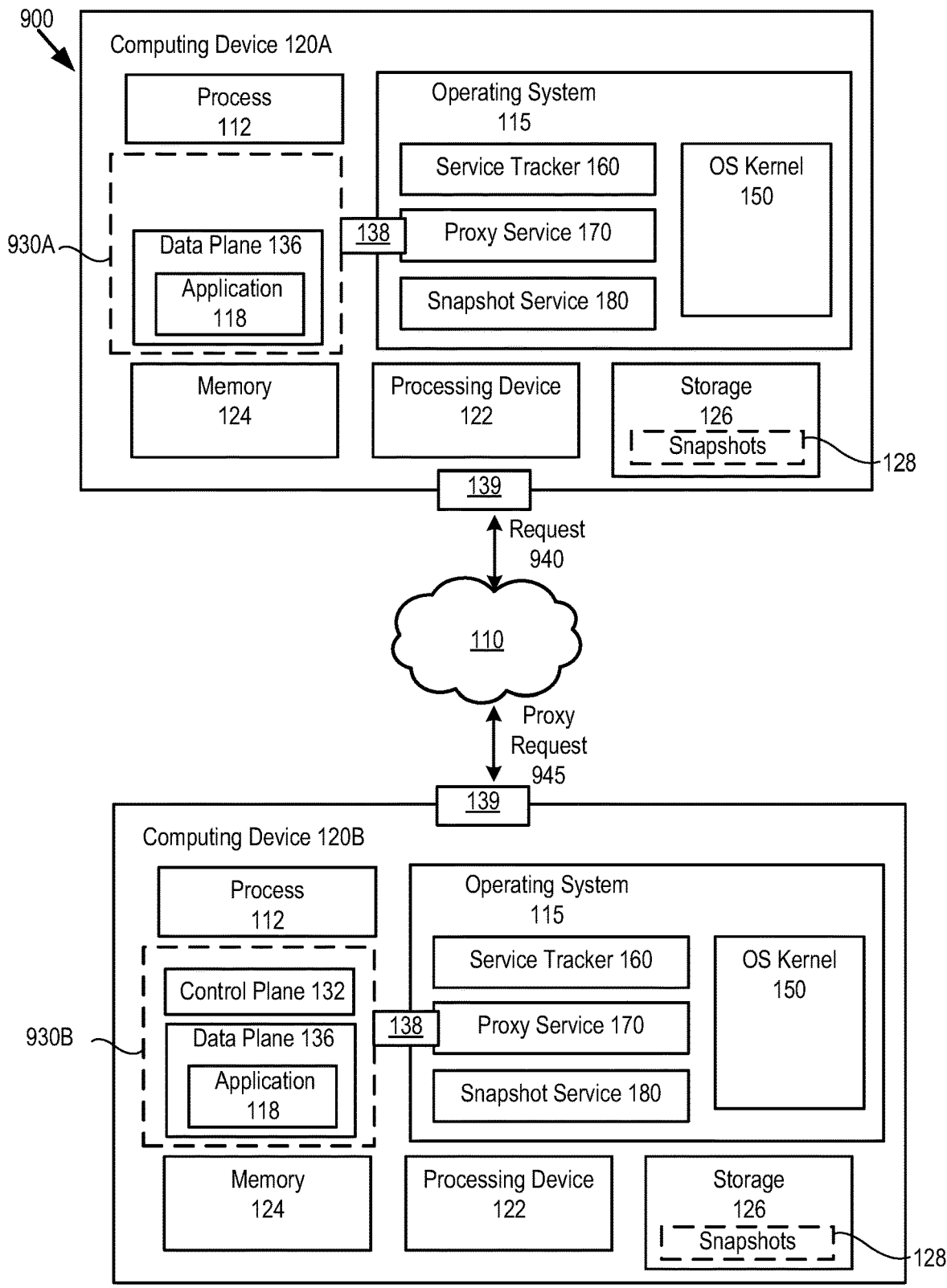
FIG. 9 is a block diagram that illustrates an example system in which a cluster infrastructure incorporates a plurality of computing devices, according to some embodiments of the present disclosure.

Though embodiments described herein have focused on embodiments in which the cluster infrastructure 130 is implemented on a computing device 120, embodiments of the present disclosure are not limited to such a configuration. FIG. 9 is a block diagram that illustrates an example system 900 in which a cluster infrastructure 930 incorporates a plurality of computing devices 120, according to some embodiments of the present disclosure. A description of elements of FIG. 9 that have been previously described will be omitted for brevity.

Referring to FIG. 9, a distributed computing system 900 may include a plurality of computing devices 120, such as first computing device 120A and second computing device 120B. The first and second computing devices 120A, 120B may be connected via network 110. The first and second computing devices 120A, 120B may communicate with one another, for example, to perform operations associated with a cluster infrastructure 930.

In some embodiments, the cluster infrastructure 930 may contain a first portion 930A executing on the first computing device 120A and a second portion 930B on the second computing device 120B. The operations of the cluster infrastructure 930 may be distributed between the first and second portions 930A, 930B. For example, in some embodiments, the data plane 136 may exist in both the first and second portions 930A, 930B of the cluster infrastructure 930.

In some embodiments, the control plane 132 may not be present in all portions of the cluster infrastructure 930. For example, as illustrated in FIG. 9, the control plane 132 may be present in the second portion 930B of the cluster infrastructure 930, but not in the first portion 930A. In such a scenario, the control plane 132 may direct the operations of the data planes 136 of both the first and second portions 930A, 930B of the cluster infrastructure 930.

FIG. 9 illustrates an example in which various portions of the cluster infrastructure 930 are present on different computing devices 120, but may be dependent on one another. In such a scenario, it may beneficial to synchronize when the cluster infrastructure is transitioned to a stopped/inactive state (or resumed from a snapshot 128) across each of the computing devices 120 participating in the cluster infrastructure.

In such a scenario, when a request 940 is received by a computing device (e.g., at proxy access point 139 of first computing device 120A) a decision may be made as to whether the cluster infrastructure 930 is to be transitioned from a stopped/inactive state to a running state, as described herein. In this case, it may be beneficial to transition all of the portions 930A, 930B of the cluster infrastructure 930 within the computing system 900. To do this, a proxy request 945 may be sent to the other computing devices 120 within the computing system 900. For example, the proxy request 945 may be sent by the proxy service 170 (though the embodiments of the present disclosure are not limited thereto).

The proxy request 945 may instruct the other computing devices 120 (e.g., the proxy service 170 of the other computing devices 120) to concurrently activate their respective portions of the cluster infrastructure 930. In this way, the state of the cluster infrastructure 930 may be synchronized across multiple machines.

A somewhat similar approach may be taken when it is determined that the cluster infrastructure 930 is to be transitioned to an inactive and/or stopped state from a running state, as described herein. For example, a proxy request 945 may be transmitted between the computing devices 120 indicating that the cluster infrastructure 930 is to be transitioned to an inactive/stopped state. Each of the computing devices 120 may respectively create snapshots 128 of their respective portions of the cluster infrastructure 930 such that the transition of the cluster infrastructure 930 to the inactive/stopped state is synchronized across the computing devices 120 of the computer system 900.

Figure 10:
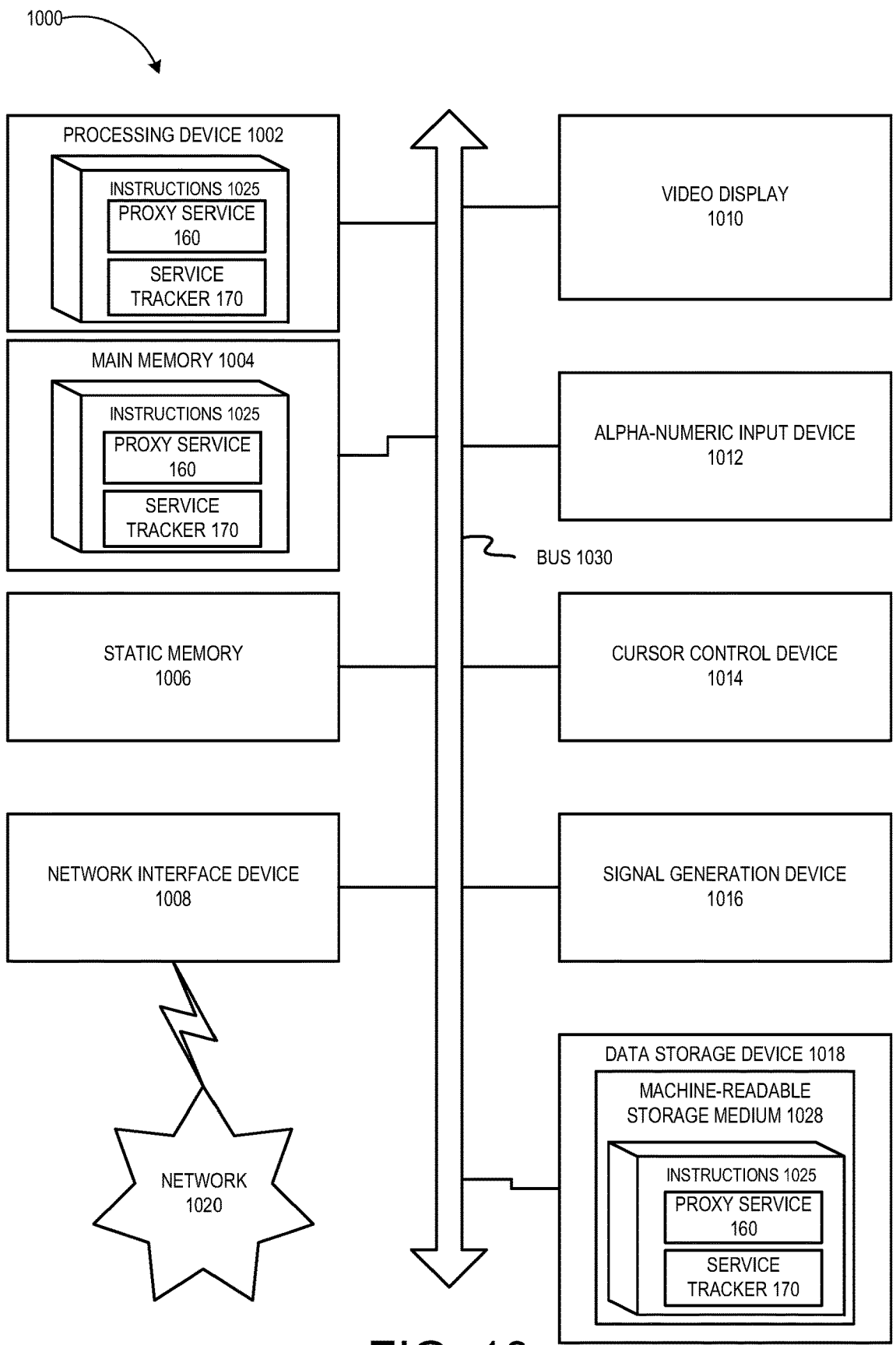
FIG. 10 is a block diagram of an example computing device that may perform one or more of the operations described herein, according to some embodiments of the present disclosure.

FIG. 10 is a block diagram of an example computing device 1000 that may perform one or more of the operations described herein, in accordance with some embodiments of the disclosure. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also include one or more special-purpose processing devices such as an application specific integrated circuit (ASIC), a field programmable gate array (FPGA), a digital signal processor (DSP), network processor, or the like. The processing device 1002 may execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions 1025 that may include instructions for a managing a cluster infrastructure, e.g., proxy service 170 and/or service tracker 160, for carrying out the operations described herein, in accordance with one or more aspects of the present disclosure. Instructions 1025 may also reside, completely or at least partially, within main memory 1004 and/or within processing device 1002 during execution thereof by computing device 1000, main memory 1004 and processing device 1002 also constituting computer-readable media. The instructions 1025 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: receiving a request over a network, the request directed to a service provided by an application of a cluster infrastructure, the cluster infrastructure comprising the application and a control plane to schedule execution of the application; responsive to receiving the request, transitioning the control plane of the cluster infrastructure from a stopped state to an active state; and transferring the request to the cluster infrastructure.

Example 2 is the method of Example 1, wherein the cluster infrastructure comprises a container image or a virtual machine (VM).

Example 3 is the method of any of Examples 1-2, wherein the cluster infrastructure comprises a container image, and wherein the container image comprises the control plane of the cluster infrastructure.

Example 4 is the method of any of Examples 1-3, wherein transitioning the control plane of the cluster infrastructure from a stopped state to an active state comprises restoring the cluster infrastructure from a data snapshot.

Example 5 is the method of any of Examples 1-4, further comprising: responsive to determining that a time duration since any request has been received that is directed to the service provided by the application has exceeded a defined duration, creating a data snapshot of the cluster infrastructure; and transitioning the control plane of the cluster infrastructure from the active state to the stopped state.

Example 6 is the method of any of Examples 1-5, wherein the cluster infrastructure provides an access point for accessing the service of the application, wherein receiving the request over the network comprises receiving the request at a proxy access point, and wherein transferring the request to the cluster infrastructure comprises transferring the request between the proxy access point and the access point provided by the cluster infrastructure.

Example 7 is the method of any of Examples 1-6, further comprising: detecting the creation of the access point provided by the cluster infrastructure; responsive to detecting the creation of the access point, creating the proxy access point that is associated with the access point provided by the cluster infrastructure.

Example 8 is the method of Example 7, wherein, detecting the creation of the access point provided by the cluster infrastructure comprises monitoring a creation of the access point and determining if the access point is to be exposed to the network.

Example 9 is the method of any of Examples 1-8, wherein the cluster infrastructure comprises a first portion on a first computing device and a second portion on a second computing device, and wherein transitioning the control plane of the cluster infrastructure from the stopped state to the active state comprises transitioning an operating state of the first portion and the second portion between the stopped state and the active state.

Example 10 is a system comprising: a memory; and a processing device operatively coupled to the memory, to: receive a request over a network, the request directed to a service provided by an application of a cluster infrastructure, the cluster infrastructure comprising the application and a control plane to schedule execution of the application; responsive to receiving the request, transition the control plane of the cluster infrastructure from a stopped state to an active state; and transfer the request to the cluster infrastructure.

Example 11 is the system of Example 10, wherein the cluster infrastructure comprises a container image or a virtual machine (VM).

Example 12 is the system of any of Examples 10-11, wherein the cluster infrastructure comprises a container image, and wherein the container image comprises the control plane of the cluster infrastructure.

Example 13 is the system of any of Examples 10-12, wherein, to transition the control plane of the cluster infrastructure from a stopped state to an active state, the processing device is to restore the cluster infrastructure from a data snapshot.

Example 14 is the system of any of Examples 10-13, wherein the processing device is further to: responsive to determining that a time duration since any request has been received that is directed to the service provided by the application has exceeded a defined duration, create a data snapshot of the cluster infrastructure; and transition the control plane of the cluster infrastructure from the active state to the stopped state.

Example 15 is the system of any of Examples 10-14, wherein the cluster infrastructure provides an access point for accessing the service of the application, wherein, to receive the request over the network, the processing device is to receive the request at a proxy access point, and wherein, to transfer the request to the cluster infrastructure, the processing device is to transfer the request between the proxy access point and the access point provided by the cluster infrastructure.

Example 16 is the system of any of Examples 10-15, wherein the processing device is further to: detect a creation of the access point provided by the cluster infrastructure; and responsive to detecting the creation of the access point, create the proxy access point that is associated with the access point provided by the cluster infrastructure.

Example 17 is the system of Example 16, wherein, to detect the creation of the access point provided by the cluster infrastructure, the processing device is to monitor a creation of the access point and determine if the access point is to be exposed to the network.

Example 18 is the system of any of Examples 10-17, wherein the cluster infrastructure comprises a first portion on a first computing device and a second portion on a second computing device, and wherein, to transition the control plane of the cluster infrastructure from the stopped state to the active state, the processing device is to transition an operating state of the first portion and the second portion between the stopped state and the active state.

Example 19 is a non-transitory computer-readable storage medium including instructions that, when executed by a processing device, cause the processing device to: receive a request over a network, the request directed to a service provided by an application of a cluster infrastructure, the cluster infrastructure comprising the application and a control plane to schedule execution of the application; responsive to receiving the request, transition, by the processing device, the control plane of the cluster infrastructure from a stopped state to an active state; and transfer the request to the cluster infrastructure.

Example 20 is the non-transitory computer-readable storage medium of Example 19, wherein the cluster infrastructure comprises a container image, and wherein the container image comprises the control plane of the cluster infrastructure.

Example 21 is the non-transitory computer-readable storage medium of any of Examples 19-20, wherein, to transition the control plane of the cluster infrastructure from a stopped state to an active state, the processing device is to restore the cluster infrastructure from a data snapshot.

Example 22 is the non-transitory computer-readable storage medium of any of Examples 19-21, wherein the processing device is further to: responsive to determining that a time duration since any request has been received that is directed to the service provided by the application has exceeded a defined duration, create a data snapshot of the cluster infrastructure; and transition the control plane of the cluster infrastructure from the active state to the stopped state.

Example 23 is the non-transitory computer-readable storage medium of any of Examples 19-22, wherein the cluster infrastructure provides an access point for accessing the service of the application, wherein, to receive the request over the network, the processing device is to receive the request at a proxy access point, and wherein, to transfer the request to the cluster infrastructure, the processing device is to transfer the request between the proxy access point and the access point provided by the cluster infrastructure.

Example 24 is the non-transitory computer-readable storage medium of any of Examples 19-23, wherein the processing device is further to: detect a creation of the access point provided by the cluster infrastructure; and responsive to detecting the creation of the access point, create the proxy access point that is associated with the access point provided by the cluster infrastructure.

Example 25 is the non-transitory computer-readable storage medium of any of Examples 19-24, wherein the cluster infrastructure comprises a container image or a virtual machine (VM).

Example 26 is the non-transitory computer-readable storage medium of Example 25, wherein, to detect the creation of the access point provided by the cluster infrastructure, the processing device is to monitor a creation of the access point and determine if the access point is to be exposed to the network.

Example 27 is the non-transitory computer-readable storage medium of any of Examples 19-26, wherein the cluster infrastructure comprises a first portion on a first computing device and a second portion on a second computing device, and wherein, to transition the control plane of the cluster infrastructure from the stopped state to the active state, the processing device is to transition an operating state of the first portion and the second portion between the stopped state and the active state.

Example 28 is a system comprising: a memory; and a processing device operatively coupled to the memory, to: detect an access point of a cluster infrastructure, the cluster infrastructure comprising an application associated with the access point and a control plane to schedule execution of the application; responsive to detecting the access point, create a proxy access point to intercept requests directed to the access point of the cluster infrastructure; and selectively control an operating state of the control plane responsive to the intercepted requests of the proxy access point.

Example 29 is the system of Example 28, wherein the cluster infrastructure comprises a container image or a virtual machine (VM).

Example 30 is the system of any of Examples 28-29, wherein the cluster infrastructure comprises a container image, and wherein the container image comprises the control plane of the cluster infrastructure.

Example 31 is the system of any of Examples 28-30, wherein to selectively control the operating state of the control plane responsive to the intercepted requests of the proxy access point, the processing device is to transition the control plane of the cluster infrastructure from a stopped state to an active state.

Example 32 is the system of any of Examples 28-31, wherein to selectively control an operating state of the control plane responsive to the intercepted requests of the proxy access point, the processing device is to transition the control plane of the cluster infrastructure from an active state to a stopped state responsive to determining that a time duration since any intercepted requests have been received has exceeded a defined duration.

Example 33 is the system of any of Examples 28-32, wherein to selectively control an operating state of the control plane responsive to the intercepted requests of the proxy access point, the processing device is to restore the cluster infrastructure from a data snapshot responsive to receiving the intercepted requests.

Example 34 is the system of any of Examples 28-33, wherein, to detect an access point of a cluster infrastructure, the processing device is to monitor a creation of the access point and determine if the access point is to be exposed to a network coupled to the system.

Example 35 is the system of Example 34, wherein to determine if the access point is to be exposed to a network coupled to the system, the processing device is to analyze a type of a service provided by the application.

Example 36 is the system of any of Examples 28-35, wherein the cluster infrastructure comprises a first portion on a first computing device and a second portion on a second computing device, and wherein to selectively control the operating state of the control plane responsive to the intercepted requests of the proxy access point, the processor is to selective transition an operating state of the first portion and the second portion between a stopped state and an active state.

Example 37 is the system of any of Examples 28-36, wherein the cluster infrastructure further comprises a data plane, and wherein the application is within the data plane.

Example 38 is the system of any of Examples 28-37, wherein the system further comprises a storage, and wherein, to selectively control the operating state of the control plane responsive to the intercepted requests of the proxy access point, the processing device is to: in response to intercepting a request directed to the access point of the cluster infrastructure, determine if the cluster infrastructure is currently executing on the system; and, responsive to determining that the cluster infrastructure is not currently executing on the system, initiate a restore of the cluster infrastructure from a data snapshot of the cluster infrastructure in the storage.

Example 39 is an apparatus comprising: means to receive a request over a network, the request directed to a service provided by an application of a cluster infrastructure, the cluster infrastructure comprising the application and a control plane to schedule execution of the application; means to transition, responsive to receiving the request, the control plane of the cluster infrastructure from a stopped state to an active state; and means to transfer the request to the cluster infrastructure.

Example 40 is the apparatus of Example 39, wherein the cluster infrastructure comprises a container image or a virtual machine (VM).

Example 41 is the apparatus of any of Examples 39-40, wherein the cluster infrastructure comprises a container image, and wherein the container image comprises the control plane of the cluster infrastructure.

Example 42 is the apparatus of any of Examples 39-41, wherein the means to transition the control plane of the cluster infrastructure from a stopped state to an active state comprises means to restore the cluster infrastructure from a data snapshot.

Example 43 is the apparatus of any of Examples 39-42, further comprising: means to create, responsive to determining that a time duration since any request has been received that is directed to the service provided by the application has exceeded a defined duration, a data snapshot of the cluster infrastructure; and means to transition the control plane of the cluster infrastructure from the active state to the stopped state.

Example 44 is the apparatus of any of Examples 39-43, wherein the cluster infrastructure provides an access point for accessing the service of the application, wherein the means to receive the request over the network comprises means to receive the request at a proxy access point, and wherein the means to transfer the request to the cluster infrastructure comprises means to transfer the request between the proxy access point and the access point provided by the cluster infrastructure.

Example 45 is the apparatus of any of Examples 39-44, further comprising: means to detect a creation of the access point provided by the cluster infrastructure; and means to create, responsive to detecting the creation of the access point, the proxy access point that is associated with the access point provided by the cluster infrastructure.

Example 46 is the apparatus of Example 45, wherein the means to detect the creation of the access point provided by the cluster infrastructure comprises means to monitor a creation of the access point and determine if the access point is to be exposed to the network.

Example 46 is the apparatus of any of Examples 39-46, wherein the cluster infrastructure comprises a first portion on a first computing device and a second portion on a second computing device, and wherein the means to transition the control plane of the cluster infrastructure from the stopped state to the active state comprises means to transition an operating state of the first portion and the second portion between the stopped state and the active state.

Unless specifically stated otherwise, terms such as "receiving," "transitioning," "transferring," "restoring," "creating," "detecting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving a request over a network, the request directed to a service provided by an application of a cluster infrastructure, the cluster infrastructure comprising the application and a control plane to schedule execution of the application;
   responsive to receiving the request, transitioning, by a processing device, the control plane of the cluster infrastructure from a stopped state to an active state; and
   transferring the request to the cluster infrastructure.

2. The method of claim 1, wherein the cluster infrastructure comprises a container image, a virtual machine (VM), or both a container image and a VM.

3. The method of claim 2, wherein the cluster infrastructure comprises the container image, and
   wherein the container image comprises the control plane of the cluster infrastructure.

4. The method of claim 1, wherein transitioning the control plane of the cluster infrastructure from a stopped state to an active state comprises restoring the cluster infrastructure from a data snapshot.

5. The method of claim 1, further comprising:
   responsive to determining that a time duration since any request has been received that is directed to the service provided by the application has exceeded a defined duration, creating a data snapshot of the cluster infrastructure; and
   transitioning the control plane of the cluster infrastructure from the active state to the stopped state.

6. The method of claim 1, wherein the cluster infrastructure provides an access point for accessing the service of the application,
   wherein receiving the request over the network comprises receiving the request at a proxy access point, and
   wherein transferring the request to the cluster infrastructure comprises transferring the request between the proxy access point and the access point provided by the cluster infrastructure.

7. The method of claim 6, further comprising:
   detecting a creation of the access point provided by the cluster infrastructure; and
   responsive to detecting the creation of the access point, creating the proxy access point that is associated with the access point provided by the cluster infrastructure.

8. A system comprising:
a memory; and
a processing device, operatively coupled to the memory, to:
receive a request over a network, the request directed to a service provided by an application of a cluster infrastructure, the cluster infrastructure comprising the application and a control plane to schedule execution of the application;
responsive to receiving the request, transition the control plane of the cluster infrastructure from a stopped state to an active state; and
transfer the request to the cluster infrastructure.

9. The system of claim 8, wherein the cluster infrastructure comprises a container image, a virtual machine (VM), or both a container image and a VM.

10. The system of claim 9, wherein the cluster infrastructure comprises the container image, and
wherein the container image comprises the control plane of the cluster infrastructure.

11. The system of claim 8, wherein, to transition the control plane of the cluster infrastructure from a stopped state to an active state, the processing device is to restore the cluster infrastructure from a data snapshot.

12. The system of claim 8, wherein the processing device is further to:
responsive to determining that a time duration since any request has been received that is directed to the service provided by the application has exceeded a defined duration, create a data snapshot of the cluster infrastructure; and
transition the control plane of the cluster infrastructure from the active state to the stopped state.

13. The system of claim 8, wherein the cluster infrastructure provides an access point for accessing the service of the application,
wherein, to receive the request over the network, the processing device is to receive the request at a proxy access point, and
wherein, to transfer the request to the cluster infrastructure, the processing device is to transfer the request between the proxy access point and the access point provided by the cluster infrastructure.

14. The system of claim 13, wherein the processing device is further to:
detect a creation of the access point provided by the cluster infrastructure; and
responsive to detecting the creation of the access point, create the proxy access point that is associated with the access point provided by the cluster infrastructure.

15. A non-transitory computer-readable storage medium including instructions that, when executed by a processing device, cause the processing device to:
receive a request over a network, the request directed to a service provided by an application of a cluster infrastructure, the cluster infrastructure comprising the application and a control plane to schedule execution of the application;
responsive to receiving the request, transition, by the processing device, the control plane of the cluster infrastructure from a stopped state to an active state; and
transfer the request to the cluster infrastructure.

16. The non-transitory computer-readable storage medium of claim 15, wherein the cluster infrastructure comprises a container image, and
wherein the container image comprises the control plane of the cluster infrastructure.

17. The non-transitory computer-readable storage medium of claim 15, wherein, to transition the control plane of the cluster infrastructure from a stopped state to an active state, the processing device is to restore the cluster infrastructure from a data snapshot.

18. The non-transitory computer-readable storage medium of claim 15, wherein the processing device is further to:
responsive to determining that a time duration since any request has been received that is directed to the service provided by the application has exceeded a defined duration, create a data snapshot of the cluster infrastructure; and
transition the control plane of the cluster infrastructure from the active state to the stopped state.

19. The non-transitory computer-readable storage medium of claim 15, wherein the cluster infrastructure provides an access point for accessing the service of the application,
wherein, to receive the request over the network, the processing device is to receive the request at a proxy access point, and
wherein, to transfer the request to the cluster infrastructure, the processing device is to transfer the request between the proxy access point and the access point provided by the cluster infrastructure.

20. The non-transitory computer-readable storage medium of claim 19, wherein the processing device is further to:
detect a creation of the access point provided by the cluster infrastructure; and
responsive to detecting the creation of the access point, create the proxy access point that is associated with the access point provided by the cluster infrastructure.

* * * * *